US004001768B2

United States Statutory Invention Registration [19]

[11] Reg. Number: H1768

Mueller et al. [45] Published: Jan. 5, 1999

[54] OXIDIZING AGENT

[75] Inventors: Kurt F. Mueller, Ft. Washington; Kerry L. Wagaman, Bryantown, both of Md.

[73] Assignee: The United States of America as represented by the Secretary of the Navy, Washington, D.C.

[21] Appl. No.: 854,034

[22] Filed: May 9, 1997

[51] Int. Cl.[6] ..... C06B 31/00; C06B 31/28

[52] U.S. Cl. ..... 149/46; 149/45; 149/36

[58] Field of Search ..... 149/45, 46

[56] References Cited

U.S. PATENT DOCUMENTS

| | | | |
|---|---|---|---|
| 4,402,775 | 9/1983 | Wood | 149/46 |
| 4,527,389 | 7/1985 | Biddle et al. | 149/45 |
| 4,956,168 | 9/1990 | Wagaman | 423/386 |
| 5,014,623 | 5/1991 | Walker et al. | 149/46 |
| 5,223,057 | 6/1993 | Mueller et al. . | |
| 5,232,526 | 8/1993 | Willer et al. | 149/45 |
| 5,574,240 | 11/1996 | Cartwright | 149/46 |
| 5,648,052 | 7/1997 | Schaefer et al. | 422/305 |
| 5,684,269 | 11/1997 | Barnes et al. | 149/45 |

*Primary Examiner*—Edward A. Miller
*Attorney, Agent, or Firm*—John L. Forrest; Roger D. Johnson

[57] ABSTRACT

Liquid oxidizer comprising an aqueous solution of hydroxyl ammonium nitrate and a nitrate salt that is ammonium nitrate or hydrazine mononitrate.

20 Claims, No Drawings

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

OXIDIZING AGENT

BACKGROUND

This invention relates to oxidizing agents and more particularly to liquid oxidizing agents.

Storable liquid oxidizers commercially available and used for propulsion purposes include (1) inhibited red fuming nitric acid (IRFNA), (2) high strength hydrogen peroxide (HSP), (3) nitrogen tetroxide ($N_2O_4$), and (4) chlorine trifluoride. All of these oxidizers have very poor handling characteristics and they pose great dangers if spilled on-board ships or airplanes. They are hypergolic with most combustible materials, cause severe burns, and blisters when they contact the skin or eyes, and they cause explosion hazards if mixed with organic matter. There is a need for liquid oxidizers which are safer and which have better handling and toxicity characteristics. The liquid oxidizers should also have low freezing points, high thermal stability, and high performance as oxidizers.

SUMMARY

Accordingly, an object of this invention is to provide new liquid oxidizers.

Another object of this invention is to provide new liquid oxidizers which are safer to handle than commercial liquid oxidizers.

A further object of this invention is to provide liquid oxidizers which are not hypergolic with combustible materials such as rocket fuels.

Yet another object of this invention is to provide liquid oxidizers with low freezing points.

A still further object of this invention is to provide liquid oxidizers with good thermal stabilities.

Still another object of this invention is to provide new high performance liquid oxidizers.

These and other objects of this invention are accomplished by providing:

aqueous solution of (1) hydroxylamine nitrate and (2) a nitrate compound that is ammonium nitrate, hydrazine mononitrate, or mixtures thereof.

DESCRIPTION

The present invention provides liquid oxidizers which may be used in gun propellants, torpedo propellants, catapult propellants, and gas generators for air bags. Preferably the liquid oxidizer and the propellant fuel are stored separately and then mixed as propellant as needed. The oxidizer and fuel may be safely mixed because the oxidizers of this invention do not react hypergolically with organic materials such as propellant fuels.

The liquid oxidizers comprise (1) a nitrate that is ammonium nitrate (AN), hydrazine mononitrate (HN), or mixtures thereof, (2) hydroxylamine nitrate (HAN), and (3) water ($H_2O$). The ammonium nitrate/hydroxylamine nitrate/water (AN-HAN-$H_2O$) liquid oxidizer comes in a high combustion temperature, high energy formulation for use in rocket propellants and explosives and a low temperature, low energy formulation for use as propellants and gas generators for torpedoes, catapults, and air bags. The high energy AN-HAN-$H_2O$ liquid oxidizer formulation comprises (1) preferably from 5 to 30 and more preferably from 10 to 25 weight percent of ammonium nitrate, (2) preferably from 60 to 85 and more preferably from 60 to 75 weight percent of hydroxylamine nitrate, and (3) preferably from 10 to 25 and more preferably from 10 to 20 weight percent of water. The low energy AN-HAN-$H_2O$ liquid oxidizer formulation comprises (1) preferably from 10 to 60 and more preferably from 10 to 40 weight percent of ammonium nitrate, (2) preferably from 10 to 70, more preferably from 30 to 70, and still more preferably from 30 to 65 weight percent of hydroxylamine nitrate, and, (3) preferably from 10 to 60, more preferably from 20 to 50, and still more preferably from 20 to 40 weight percent of water.

The hydrazine mononitrate/hydroxylamine nitrate/water (HN-HAN-$H_2O$) liquid oxidizer comprises (1) preferably from 4 to 50 and more preferably from 5 to 30 weight percent of hydrazine mononitrate, (2) preferably from 30 to 80 and more preferably from 50 to 80 weight percent of hydroxylamine nitrate, and (3) preferably from 10 to 30 and more preferably from 10 to 20 weight percent of water. The HN-HAN-$H_2O$ liquid oxidizer can be adjusted within these ranges for use in high combustion temperature, high pressure, high energy applications such as rocket propellants and explosives or low temperature, low pressure, low energy applications such as air bags, torpedo propellants, or catapult propellants. Increasing the water content of the liquid oxidizer lowers the combustion temperature and energy produced by the reaction of the oxidizer with a fuel.

The water used in the AN-HAN-$H_2O$ and the HN-HAN-$H_2O$ liquid oxidizers can be sea water, ordinary fresh water, or distilled water.

It is preferable that the liquid oxidizers have low freezing points. For many military applications a freezing point of −40° C. is desired. Table 1 presents freezing point data for solutions of hydroxylamine nitrate (HAN) in water ($H_2O$). A water content of about 25 weight percent is required to produce a freezing point of −40° C. in the HAN-$H_2O$ solutions.

TABLE 1

FREEZING POINTS OF THE SYSTEM HAN-WATER

| % HAN | % $H_2O$ | Freezing Point °C. |
|---|---|---|
| 84.1 | 15.9 | −15 |
| 83.1 | 16.9 | −17 |
| 82.1 | 17.9 | −22 |
| 81.0 | 19.0 | −30 |
| 78.0 | 22.0 | −35 |
| 77.3 | 22.7 | −37 |
| 66.5 | 33.5 | −44 |
| 60.0 | 40.0 | −34 |
| 55.0 | 45.0 | −28 |
| 50.3 | 49.7 | −24 |
| 45.2 | 54.8 | −18 |

In contrast, a water content of 15 or more weight percent will achieve a freezing point of −40° C. in ammonium nitrate-hydroxylamine nitrate-water (AN-HAN-$H_2O$) liquid oxidizers. Freezing point data for AN-HAN-$H_2O$ solutions is presented in table 2.

TABLE 2

PHYSICAL/CHEMICAL PROPERTIES OF HAN-AN-$H_2O$ MIXTURES

| WT % HAN | WT % AN | WT % $H_2O$ | FREEZING POINT (°C.) | DENSITY (g/cc) |
|---|---|---|---|---|
| 84.1 | 0.0 | 15.9 | −15 | — |
| 83.1 | 0.0 | 16.9 | −17 | — |
| 82.1 | 0.0 | 17.9 | −22 | — |
| 82.0 | 5.0 | 13.0 | −5 | — |
| 81.0 | 0.0 | 19.0 | −30 | — |
| 80.0 | 5.0 | 15.0 | −18 | — |

TABLE 2-continued

| PHYSICAL/CHEMICAL PROPERTIES OF HAN-AN-$H_2O$ MIXTURES | | | | |
|---|---|---|---|---|
| WT % HAN | WT % AN | WT % $H_2O$ | FREEZING POINT (°C.) | DENSITY (g/cc) |
| 79.0 | 0.0 | 21.0 | −28 | — |
| 78.0 | 0.0 | 22.0 | −35 | — |
| 77.3 | 0.0 | 22.7 | −37 | — |
| 77.0 | 10.0 | 13.0 | −19 | — |
| 75.2 | 1.7 | 23.1 | −44 | — |
| 75.0 | 10.0 | 15.0 | −38 | — |
| 74.0 | 6.4 | 19.6 | −27 | — |
| 72.3 | 0.0 | 27.7 | −35 | — |
| 72.0 | 15.0 | 13.0 | −26 | — |
| 72.0 | 13.0 | 15.0 | −40 | — |
| 71.5 | 2.1 | 26.4 | −56 | — |
| 71.0 | 14.0 | 15.0 | −41 | — |
| 70.3 | 11.1 | 18.6 | −42 | — |
| 70.0 | 15.0 | 15.0 | −43 | 1.538 |
| 70.0 | 17.0 | 13.0 | −29 | — |
| 69.0 | 16.0 | 15.0 | −37 | — |
| 69.0 | 18.0 | 13.0 | −31 | — |
| 68.0 | 17.0 | 15.0 | −35 | — |
| 68.0 | 19.0 | 13.0 | −29 | — |
| 67.0 | 20.0 | 13.0 | −28 | — |
| 66.7 | 14.3 | 19.0 | −29 | 1.504 |
| 66.5 | 0.0 | 33.5 | −44 | — |
| 66.0 | 21.0 | 13.0 | −27 | — |
| 65.0 | 20.0 | 15.0 | −32 | — |
| 65.0 | 22.0 | 13.0 | −26 | — |
| 63.7 | 13.8 | 22.7 | −34 | 1.474 |
| 62.0 | 25.0 | 13.0 | −23 | — |
| 60.9 | 13.0 | 26.1 | −43 | 1.447 |
| 60.0 | 0.0 | 40.0 | −34 | — |
| 58.3 | 12.5 | 29.2 | −42 | 1.424 |
| 56.0 | 12.0 | 32.0 | −40 | 1.403 |
| 55.0 | 0.0 | 45.0 | −28 | — |
| 53.5 | 11.5 | 30.0 | −34 | 1.386 |
| 50.3 | 0.0 | 49.7 | −24 | — |
| 42.2 | 0.0 | 54.8 | −18 | — |

Similarly, a water content of 13 or more weight percent will achieve a freezing point of −40° C. in hydrazine mononitrate-hydroxylamine nitrate-water (HN-HAN-$H_2O$) liquid oxidizers. Freezing point data for HN-HAN-$H_2O$ solutions is presented in table 3.

TABLE 3

FREEZING POINTS OF THE SYSTEM HAN-HN-$H_2O$

| Wt % HAN | Wt % $H_2O$ | Wt % $H_2O$ | Freezing Point (°C.) |
|---|---|---|---|
| 84.1 | — | 15.9 | −15 |
| 81.0 | — | 19.0 | −30 |
| 78.52 | 1.73 | 19.75 | −40* |
| 77.10 | 3.51 | 19.39 | −40* |
| 74.39 | 6.89 | 18.72 | −40* |
| 73.78 | 7.77 | 18.45 | −50 |
| 71.89 | 10.13 | 17.98 | −40 |
| 68.03 | 14.96 | 17.01 | −41 |
| 75.0 | 12.0 | 13.0 | −19 |
| 70.0 | 17.0 | 13.0 | −28 |
| 68.0 | 19.0 | 13.0 | −30 |
| 67.0 | 20.0 | 13.0 | −37 |
| 66.0 | 21.0 | 13.0 | −39 |
| 65.0 | 22.0 | 13.0 | −44 |
| 64.0 | 23.0 | 13.0 | −42 |
| 63.0 | 24.0 | 13.0 | −35 |
| 60.0 | 27.0 | 13.0 | −28 |

*Sharp freezing points could not be obtained because of repeated supercooling.

Some physical properties and the thermal stability data, investigated by differential thermal analysis (DTA) are given in Table 4. The results show that the thermal stability of the Oxsols is at least equal or better than that of conventional solid gun propellants.

TABLE 4

PROPERTIES OF OXSOL 1 AND OXSOL 2

| | DTA Exotherm* Start | DTA Exo-therm | Density at 23.1° C. | Freezing Point |
|---|---|---|---|---|
| OXSOL 1: 70% HAN 15% AN 15% $H_2O$ | 155° C. | 162° C. | 1.530 g/cm$^3$ | −43° C. |
| OXSOL 2: 65% HAN 22% HN 13% $H_2O$ | 165° C. | 162° C. | 1552 g/cm$^3$ | −44° C. |

*The heating rate was 1° C. per minute

The ammonium nitrate-hydroxylamine nitrate-water liquid oxidizer may be prepared by mixing the desired proportions of ammonium nitrate, hydroxylamine nitrate, and water at ambient temperature until the nitrate salts have completely dissolved into the water. similarly, the hydrazine mononitrate-hydroxylamine nitrate-water liquid oxidizer may be prepared by mixing the desired proportions of hydrazine mononitrate, hydroxylamine nitrate, and water at ambient temperature until the nitrate salts have completely dissolved into the water.

The liquid oxidizers of this invention are not hypergolic with fuels, and propellant mixtures of the liquid oxidizers and fuels are stable and safe to store. However, for added safety the liquid oxidizer and liquid fuel are preferably stored apart and mixed as needed. The propellant mixtures of liquid oxidizer and fuel lend themselves to controlled electrical ignition because of their high electrical conductivity or can be ignited by means of catalytical resin bed or an igniter squib.

Because the liquid oxidizers of this invention consist of aqueous salt solutions, their vapor phase practically consists of water only, rather than toxic chemicals. Spills of the liquid oxidizers may easily be washed away with water. Moreover, contact of the oxidizers with skin or eyes does not cause severe detrimental effects, if it is washed off with water within a few minutes after contact.

The preferred embodiments of this invention are the liquid oxidizer compositions OXSOL 1 (70 weight percent hydroxylamine nitrate, 15 weight percent ammonium nitrate, and 15 weight percent water) and OXSOL 2 (65 weight percent hydroxylamine nitrate, 22 weight percent hydrazine mononitrate, and 13 weight percent water). These liquid oxidizer compositions are preferred because of their combination of high energy, low freezing point, and low sensitivities. OXSOL 1 is more preferred than OXSOL 2 because OXSOL 1 was not detonated in the bullet impact test whereas OXSOL 2 was detonated.

The sensitivity characteristics of OXSOL 1 and OXSOL 2 liquid oxidizers were measured by standard tests and the results are summarized in table 5. The cavity drop test is designed to determine the ease of initiation of detonation by adiabatic compression of air bubbles which may be present in a liquid explosive. In this test 0.03 ml of a liquid explosive (or in this case energetic liquid oxidizer) is put into a cavity in a steel cup. The cavity is sealed by an O-ring and a thin-steel diaphragm. A weight is allowed to fall on the pin resting on the steel diaphragm. The test result is expressed as the minimum product of height and weight necessary to cause detonation. The card gap test (JANNAF Test No. 1) is performed by filling a Teflon coated steel pipe 1 inch in diameter and 3 inches high with the OXSOL 1 or OXSOL 2 sample. A loose steel pipe is mounted on top of this pipe. Cellulose acetate cards are stacked between the bottom of this filled pipe and an explosive tetryl pellet, which is fitted with a suitable igniting device. The tetryl is ignited and the results are recorded as the number of cellulose acetate cards necessary to prevent ignition of the monopropellant and concomitant damage to the loose steel plate. The J2 blasting cap test is performed by placing the OXSOL 1 or OXSOL 2 liquid oxidizer in an open cup which is placed upon a lead cylinder. A J2 blasting cap is immersed in the OXSOL 1 or OXSOL 2 liquid oxidizer sample and then set off. A negative J2 cap test does not produce any detonation. The unconfined burning test is performed by adding one of these liquid oxidizers to a walled polyethylene container to 90 to 95 percent capacity. The solution is then placed on a wood bonfire. A negative test result is one in which neither a deflagration nor a detonation occurs. The bullet impact test is performed by confining the OXSOL 1 or OXSOL 2 liquid oxidizer sample in a 2 inch diameter and 66 inch long pipe and firing a bullet perpendicular to the pipe and completely therethrough. A negative test result is one in which the bullet goes through. the pipe without any detonation.

The test results listed in Table 5 show that both OXSOL 1 and OXSOL 2 have a low level of sensitivity. The only positive test obtained was the bullet impact test of OXSOL 2. This does not rule out the oxidizer from use in aircraft or ships, since the results of the bullet impact test depend not only on the propellant but also on its container. Heavy confinement will give apparently higher sensitivity levels; light confinement will give the opposite result. A final decision in this matter can only be made with a test using the actual oxidizer tank as a container. Addition of water to this formulation will also insensitize this oxidizer to this test.

TABLE 5

SENSITIVITY CHARACTERISTIC OF OXSOL 1 AND OXSOL 2

| | Oxsol 1 | Oxsol 2 |
|---|---|---|
| Cavity Drop Test | >100 kg cm | >100 kg cm |
| Card Gap Test | Zero cards (3 tests) | Zero cards (3 tests) |
| J2 Blasing Cap Test | negative (5 tests) | Negative (5 tests) |
| Unconfined Burning Test | Negative (3 tests) | Negative (3 tests) |
| Bullet Impact Test | Negative (4 tests) | Positive (2 tests) |

In predicting the theoretical performance of propellants, formulators and developers must be able to predict the densities of components such as oxidizers with reasonable accuracy. The existing computer codes for predicting the densities of oxidizers have been based on solid propellant oxidizers. When applied to liquid oxidizers, the codes predict densities that are as much as 30 percent higher than the actual density of the liquid oxidizers.

The following mathematical equation is provided as a means of more accurately predicting the density of various ammonium nitrate-hydroxylamine nitrate-water (AN-HAN-$H_2O$) compositions. Table 6 summarizes the experimentally determined densities for various AN-HAN-$H_2O$ liquid oxidizer compositions. The density data points in Table 6 have been used to fit the following cubic equation:

$$\begin{aligned}\text{Density in g/cc} = {} & (1.713)(\text{HAN}) + (1.389)(\text{AN}) + \\ & (1.018)(\text{Water}) + (7.736)(\text{HAN})(\text{AN}) - \\ & (0.361)(\text{HAN})(\text{Water}) + (0.110)(\text{AN})(\text{Water}) - \\ & (7.040)(\text{HAN})(\text{AN})(\text{Water}) - \\ & (11.896)(\text{HAN})(\text{AN})(\text{HAN} - \text{AN}) - \\ & (0.0409)(\text{HAN})(\text{Water})(\text{HAN} - \text{Water}) + \\ & (0.329)(\text{AN})(\text{Water})(\text{AN} - \text{Water})\end{aligned}$$

where

AN=the weight fraction of ammonium nitrate in the test solution,

NA=the weight fraction of nitric acid in the test solution, and

Water=the weight fraction of water in the test solution.

The following calculation illustrates how to use this equation to calculate the densities of OXSOL 1 (70% hydroxylamine nitrate, 15% ammonium nitrate, and 15% water).

OXSOL 1:

HAN=0.70

AN=0.15

Water=0.15

$$\begin{aligned}\text{Density} = {} & (1.713)(0.70) + (1.389)(0.15) + \\ & (1.018)(0.15) + (0.736)(0.70)(0.15) - \\ & (0.361)(0.70)(0.15) + (0.110)(0.15)(0.15) - \\ & (7.040)(0.70)(0.15)(0.15) - \\ & (11.896)(0.70)(0.15)(0.70 - 0.15) - \\ & (0.041)(0.70)(0.15)(0.70 - 0.15) + \\ & (0.329)(0.15)(0.15)(0.15 - 0.15)\end{aligned}$$

$$\begin{aligned}\text{Density} &= 1.199 + 0.209 + 0.153 = 0.077 - 0.037 + 0.002 - \\ &\quad 0.111 - 0.687 + 0.002 \\ &= 1.639\text{g/cc}\end{aligned}$$

Experimental value of OXSOL 1's density is 1.538 g/cc.

Differences between the experimental and calculated values for density will be greater for the more concentrated (less water) solutions than for the diluted oxidizer solutions. However, these calculated values will be satisfactory for preliminary combustion engineering designs and will be far superior to computer code calculated values.

In a similar manner, one can experimentally measure the densities of a number of hydrazine mononitrate-hydroxylamine nitrate-water (HN-HAN-$H_2O$) compositions and then fit them to a curve to obtain a formula for predicting the densities of HN-HAN-$H_2O$ solutions.

TABLE 6

Densities of Ammonium Nitrate-Hydroxylamine Nitrate-Water Solutions

| HAN | AN | $H_2O$ | Density |
|---|---|---|---|
| 0.700 | 0.150 | 0.150 | 1.538 |
| 0.667 | 0.143 | 0.190 | 1.504 |
| 0.637 | 0.136 | 0.227 | 1.474 |
| 0.609 | 0.130 | 0.261 | 1.447 |
| 0.583 | 0.125 | 0.292 | 1.424 |
| 0.560 | 0.120 | 0.320 | 1.403 |
| 0.538 | 0.115 | 0.347 | 1.386 |
| 0 | 0.748 | 0.252 | 1.346 |
| 0 | 0.720 | 0.280 | 1.334 |
| 0 | 0.682 | 0.318 | 1.32 |

TABLE 6-continued

Densities of Ammonium Nitrate-Hydroxylamine Nitrate-Water Solutions

| HAN | AN | $H_2O$ | Density |
|---|---|---|---|
| 0 | 0.658 | 0.342 | 1.312 |
| 0 | 0.605 | 0.395 | 1.295 |
| 0 | 0.477 | 0.523 | 1.21 |
| 0 | 0.428 | 0.572 | 1.19 |
| 0 | 0.386 | 0.614 | 1.17 |
| 0 | 0.260 | 0.740 | 1.11 |
| 0 | 0.127 | 0.873 | 1.05 |
| 0.237 | 0 | 0.763 | 1.125 |
| 0.266 | 0 | 0.734 | 1.128 |
| 0.412 | 0 | 0.588 | 1.211 |
| 0.409 | 0 | 0.591 | 1.229 |
| 0.508 | 0 | 0.492 | 1.297 |
| 0.543 | 0 | 0.457 | 1.284 |
| 0.617 | 0 | 0.383 | 1.375 |
| 0.639 | 0 | 0.361 | 1.367 |
| 0.734 | 0 | 0.266 | 1.445 |
| 0.796 | 0 | 0.204 | 1.523 |
| 0.819 | 0 | 0.181 | 1.523 |
| 0.947 | 0 | 0.053 | 1.656 |

The theoretical performance parameters of the two new oxidizers with hydrocarbon fuels are given in Table 7; for comparison the table also contains the values of the system IRFNA-hydrocarbon fuel and of two conventional solid gun propellants.

Propellants formulations of mixtures of oxidizers and fuels are evaluated by theoretical calculations. The values reported in table 7 are determined from the formula I=nRT wherein I is the impetus, n is moles of gas produced by the propellant upon ignition, R is the gas constant, and T is the temperature of the propellant. Calculations are determined by using a computer program written at the Naval Weapons Center in China Lake, Calif., and modified by Edward Baroody of the Naval Surface Warfare Center at Indian Head, Md. All calculations are based on oxidizer/fuel ratios which will produce only water, carbon dioxide and nitrogen as the combustion products. The values in Table 7 show that the performance of the new liquid oxidizers on a volume basis is close to that of IRFNA. In comparison with conventional solid gun propellants, the new liquid bipropellants are superior.

TABLE 7

THEORETICAL PERFORMANCE OF GUN PROPELLANTS

| Propellant | Impetus ft. lb/lb × $10^3$ | Volume Impetus (ft. lb/ft$^3$ × $10^3$) | Isochoric Flame temp (K) | ISP (sec) |
|---|---|---|---|---|
| 92.94% OXSOL 1 7.06% JP-4 | 337 | 310 | 2,769 | 231 |
| 93.64% OXSOL 2 6.36% JP-4 | 348 | 328 | 2,869 | 237 |
| 84.78% IRNFA 15.22% JP-4 | 401 | 345 | 4,040 | 262 |
| M6 (solid propellant) | 318 | 189* | 2,583 | — |
| M26 (solid propellant) | 362 | 214* | 3,059 | — |

*based on a loading density of 0.95 g/cm$^3$

The ammonium nitrate/hydroxylamine nitrate/water and the hydrazine mononitrate/hydroxylamine nitrate/water liquid oxidizers are thoroughly mixed with the hydrocarbon fuels to produce emulsions which are used as the propellants. The fuels include conventional military fuels such as JP-4, JP-5, JP-8, JP-10, Otto fuel II, and MAF-4. In-line static mixers or the turbulent flow in pumps or in the swirl-sections of injector spray nozzles will produce fine-droplet dispersions of these oil-like fuels in the water-based oxidizers of this invention. Conventional emulsifiers such as an anionic surfactant (e.g., sodium alcohol sulfates) or a nonionic surfactant (e.g., sorbitan fatty acid esters) may be used to improve the stability of the emulsions. Although the mixture of the liquid oxidizer and fuel may be safely stored together, the safety/vulnerability is improved by storing the liquid oxidizer alone and then mixing it with the fuel as needed.

In other applications such as gas generators for air bags, the fuel may also be water soluble and will mix readily with the liquid oxidizers of this invention to produce homogeneous water-based monopropellants.

Obviously, other modifications and variations of the present invention may be possible in light of the foregoing teachings. It is therefore to be understood that within the scope of the appended claims the invention may be practiced otherwise than as specifically described.

What is claimed is:

1. A liquid oxidizer comprising:

a solution of (1) from 5 to 30 weight percent of ammonium nitrate;

(2) from 60 to 85 weight percent of hydroxylamine nitrate; and (3) from 10 to 25 weight percent of water.

2. The liquid oxidizer of claim 1 wherein ammonium nitrate comprises from 10 to 25 weight percent of the oxidizer.

3. The liquid oxidizer of claim 1 wherein hydroxylamine nitrate comprises from 60 to 75 weight percent of the oxidizer.

4. The liquid oxidizer of claim 1 wherein water comprises 10 to 20 weight percent of the oxidizer.

5. A liquid oxidizer comprising:

a solution of (1) from 10 to 60 weight percent of ammonium nitrate;

(2) from 10 to 70 weight percent of hydroxylamine nitrate; and (3) from 10 to 60 weight percent of water.

6. The liquid oxidizer of claim 5 wherein ammonium nitrate comprises form 10 to 40 weight percent of the oxidizer.

7. The liquid oxidizer of claim 5 wherein hydroxylamine nitrate comprises form 30 to 70 weight percent of the oxidizer.

8. The liquid oxidizer of claim 7 wherein hydroxylamine nitrate comprises from 30 to 65 weight percent of the oxidizer.

9. The liquid oxidizer of claim 5 wherein water comprises 20 to 50 weight percent of the oxidizer.

10. The liquid oxidizer of claim 9 wherein water comprises 20 to 40 weight percent of the oxidizer.

11. In a liquid propellant comprising a fuel and a liquid oxidizer the improvement comprising using a liquid oxidizer that is a solution of (1) from 5 to 30 weight percent of ammonium nitrate;

(2) from 60 to 85 weight percent of hydroxylamine nitrate; and (3) from 10 to 25 weight percent of water.

12. The liquid propellant of claim 11 wherein ammonium nitrate comprises from 10 to 25 weight percent of the liquid oxidizer.

13. The liquid propellant of claim 11 wherein hydroxylamine nitrate comprises from 60 to 75 weight percent of the liquid oxidizer.

14. The liquid propellant of claim 11 wherein water comprises 10 to 20 weight percent of the liquid oxidizer.

15. In a liquid propellant comprising a fuel and a liquid oxidizer the improvement comprising using a liquid oxidizer that is a solution of (1) from 10 to 60 weight percent of ammonium nitrate;

(2) from 10 to 70 weight percent of hydroxylamine nitrate; and (3) from 10 to 60 weight percent of water.

16. The liquid propellant of claim 15 wherein ammonium nitrate comprises from 10 to 40 weight percent of the liquid oxidizer.

17. The liquid propellant of claim 15 wherein hydroxylamine nitrate comprises from 30 to 70 weight percent of the liquid oxidizer.

18. The liquid propellant of claim 17 wherein hydroxylamine nitrate comprises from 30 to 65 weight percent of the liquid oxidizer.

19. The liquid propellant of claim 15 wherein water comprises 20 to 50 weight percent of the liquid oxidizer.

20. The liquid propellant of claim 19 wherein water comprises 20 to 40 weight percent of the liquid oxidizer.

* * * * *